United States Patent [19]

Taylor

[11] Patent Number: 5,342,030
[45] Date of Patent: Aug. 30, 1994

[54] TRUSS JIGGING SYSTEM

[75] Inventor: Peter W. Taylor, Wauchope, Australia

[73] Assignee: Multinail Truss System Pty., Ltd., New South Wales, Australia

[21] Appl. No.: 82,964

[22] Filed: Jun. 29, 1993

[30] Foreign Application Priority Data

Nov. 16, 1992 [AU] Australia ............... PL5882

[51] Int. Cl.$^5$ ............................................ B30B 3/02
[52] U.S. Cl. ............................ 269/37; 269/304; 269/910; 29/281.3
[58] Field of Search ............. 100/913, 295, 100; 269/37, 43, 40, 303, 304, 910; 29/281.1, 281.3, 897.31; 227/152, 154, 155

[56] References Cited

U.S. PATENT DOCUMENTS

| | | | |
|---|---|---|---|
| 4,084,499 | 4/1978 | Moehlenpah | 269/910 |
| 4,174,061 | 11/1979 | McDonald | 269/910 |
| 4,271,730 | 6/1981 | Holl et al. | 81/57.24 |
| 5,085,414 | 2/1992 | Weaver | 269/910 |
| 5,211,381 | 5/1993 | Shaw | 269/910 |

*Primary Examiner*—Robert C. Watson
*Attorney, Agent, or Firm*—Richard C. Litman

[57] ABSTRACT

An assembly table for roof trusses has open parallel channels located on the table which contain jig stops. The jig stops are moveable along their respective channels by means of a connector head which can be raised and lowered from a gantry carriage located on a gantry which spans the table and runs along tracks located on each side of the table. The respective movements and operation of the gantry, gantry carriage and connector head are controlled by a computer.

8 Claims, 8 Drawing Sheets

GANTRY MOVEMENT
( X DIRECTION )

TRUSS JIGGING SYSTEM

The present invention relates to apparatus for assembling wooden structures from elongated members, and in particular to apparatus for the assembly of wooden trusses for the building industry.

Wooden trusses, particularly roof trusses, are assembled on large assembly tables, wherein stops or bobbins are positioned on the table to hold the wooden members in the required position while connector plates are pressed across or into the joints to form the truss.

Efforts have been made to improve the positioning of the stops to speed up construction time.

U.S. Pat. No. 5,085,414—Weaver, describes a jig for forming wooden trusses, which comprises a table transversed by upwardly opening channels along which stop units can slide. The stop units are manually positioned and locked into predetermined positions to locate the wooden members to form the truss. Hence the accuracy of the shape of the truss is dependant on the ability of the operator to align the stops against the scales alongside, next to or in the transverse channels.

An attempt has been made to automate the setting up of the stops on the jig, and is disclosed in U.S. Pat. No. 5,092,028—Harnden. There is disclosed a jig having a table transversed by a plurality of parallel elongated openings. Jig stops are positioned in the openings and each jig stop is individually adjustable along the openings by respective lead screw driven by a stepper motor. The motors are controlled from a computer to automatically position the jig stops in accordance with a particular design of truss.

Whilst this jig provides for automatic placement of the jig stops, it is expensive as it requires an individual stepper motor and associated lead screw and drives for each jig stop in each transverse channel further only one stop may be used per transverse channel, which can prevent the stops from providing close restraint to the truss members.

The present invention seeks to ameliorate the disadvantages of the before mentioned prior art apparatus by providing a truss assembly apparatus comprising:

an assembly table comprising two parallel spaced apart tracks extending along two opposed sides of said table, and a plurality of upwardly open channels extending, parallel to each other, between said two parallel spaced apart tracks;

jig bobbins located in said upwardly open channels and adapted to slide therealong;

locking means, located on each jig bobbin, adapted to releasably secure the respective jig bobbin at any position along its respective upwardly open channel;

a gantry, bridging said tracks and adapted to travel along said tracks;

a gantry carriage adapted to travel across said gantry, between said tracks;

engaging means, located on said gantry carriage, adapted to individually engage said jig bobbins and to operate said locking means of said jig bobbin;

store means adapted to store positional information, designating the position of each jig bobbin for a predetermined truss design; and operating means adapted to act on said positional information received from said store means, to move said gantry along said track and said carriage across said gantry;

whereby, in use, said operating means moves said engaging means to individually engage respective jig bobbins and to unlock it locking means and to move the respective jig bobbin to a required position where said locking means is activated, and said engaging means then disengages from said jig bobbin, leaving said jig bobbin in its position for a predetermined truss design.

The present invention will now be described by way of example with reference to the accompanying drawings, in which.

Figure 1:
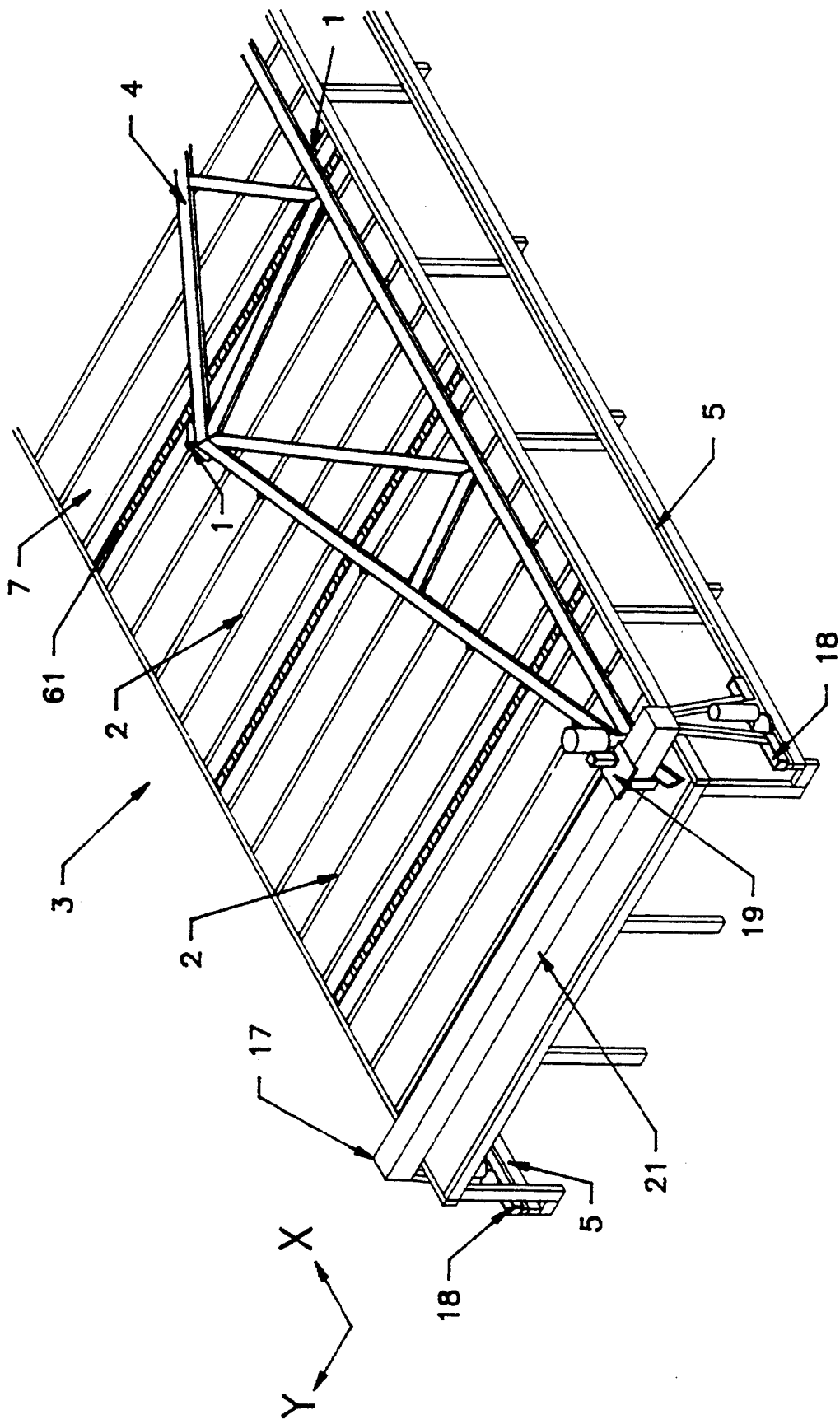
FIG. 1 illustrates a truss assembly apparatus according to one embodiment of the present invention, showing a truss in position on the apparatus.

An engineering computer, prepares an engineering design based on the requirements of a customer for a wooden truss or other planar structures. Precise positional data for a plurality of jig bobbins (1) corresponding to positions along respective open channel (2) of the table (3), define the external points of the components of the truss (4) as shown in FIG. 1. The components of the truss (4) having been cut to the required shape as specified by the engineering computer.

The positional information will be placed on a diskette and given to the operator to show what channels will be activated when assembling this truss., The diskette is accessed by the gantry computer to begin assembly of the truss. If it is required, however, the gantry operator could directly access the engineering computer to obtain the positional data for the new truss.

The assembly table (3), according to one embodiment, as shown in FIG. 1, comprises two parallel tracks (5) which run the length of the table (3). Running between the tracks (5) are a plurality of parallel open channels (2). These channels (2) are shown substantially at right angles or transversely disposed to the tracks (5) but could be at any angle such as 60° or 45° or even parallel to the tracks. A support surface (7) can link adjacent channels (2). Located in each channel (2) are, in this case, two jig bobbins (1) although any number of bobbins such as one or more can be used, depending on the truss design.

Figure 2:
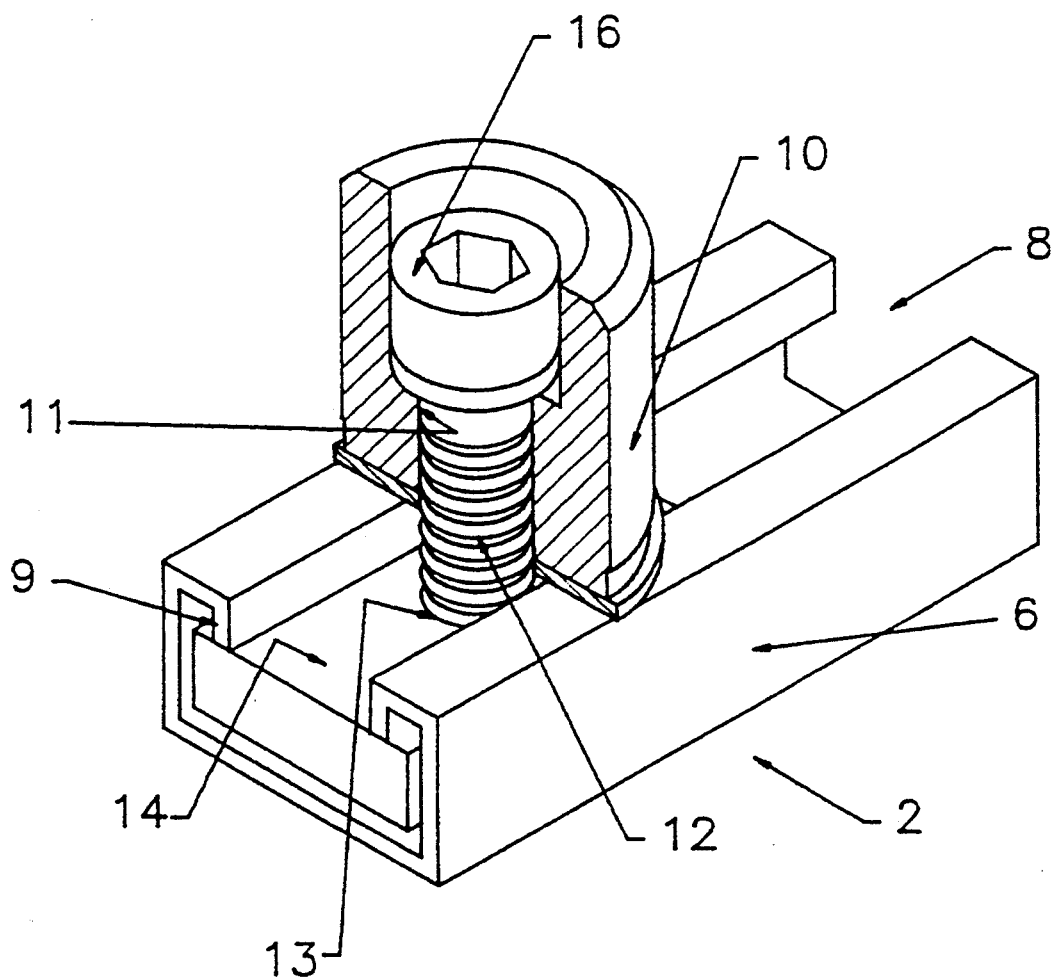
FIG 2 illustrates a sectional view of a jig bobbin in a channel.

As shown in FIG. 2, the channels (2) comprise a constant cross-section extrusion (6) having an opening (8) with re-entrant shoulders (9).

Each bobbin (1), as shown in FIG. 2, comprises a stop (10) in the form of a cylinder which sits above the channel (2) and has a bore (11) extending centrally therethrough. A bolt (12) provided with an allen key slot head (16), extends through the bore (11) and engages in a threaded recess (13) in a clamp member (14) located in the channel (2). The clamp member (14) could have recesses to receive the re-entrant shoulders (9) of the channel, so as to prevent rotation of the clamp member (14) within the channel (2). The clamp and the stop can be of any suitable shape as shown in FIG. 2 so as the clamp member (14) is restrained from rotation within the channel (2).

Figure 3:
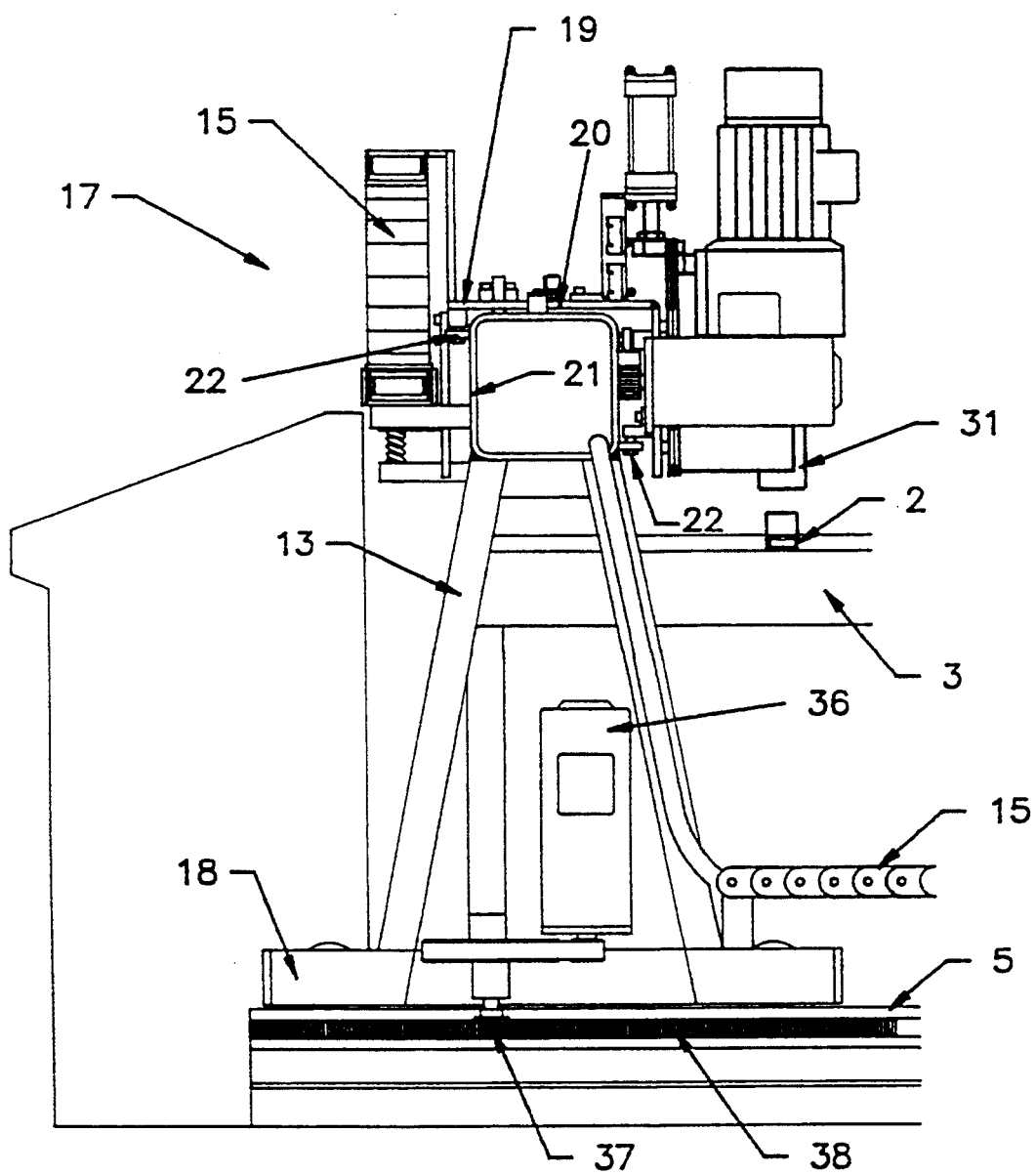
FIG. 3 illustrates a part view of the embodiment illustrated in FIG. 1, with the engaging head free of the jig bobbin.
Figure 3:
Figure 4:
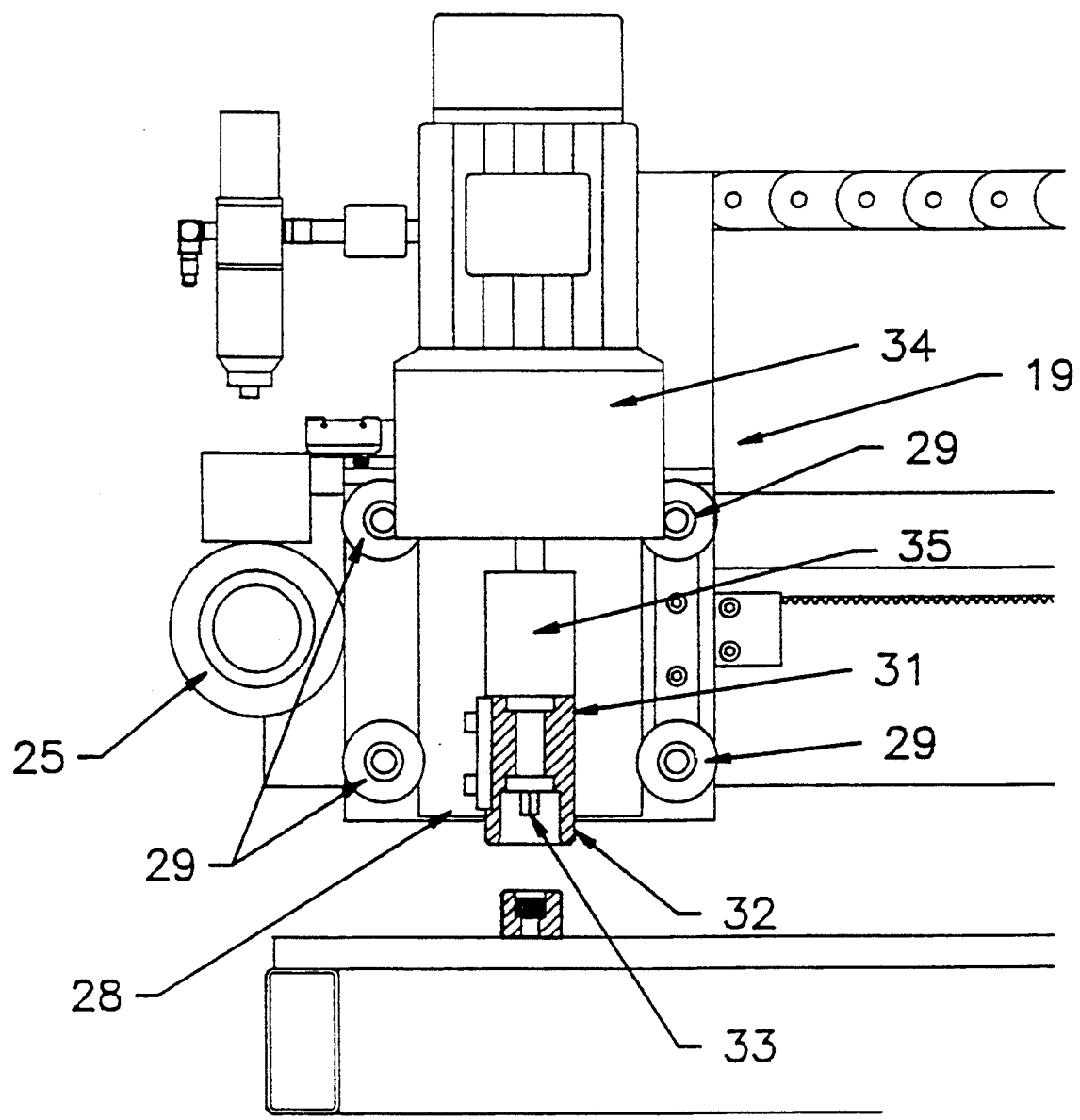
FIG. 4 illustrates a part cut-away view of the carriage illustrated in FIG. 3.

As shown in FIGS. 1, and 3 to 6, a gantry (17) straddles and the table (3) and is connected by struts (13) to wheeled feet (18) which runs along the tracks (5). As shown in FIG. 3, the wheeled feet (18) have a motor (36) which drives a pinion (37) which engages on a rack (38) extending along the length of the tracks (5). A gantry carriage (19) runs along the gantry (17).

The gantry carriage (19) comprises a U-shaped base (20) which is supported on the gantry bean (21) by bearings (22). A rack (23) extends along the gantry beam (21) and is engaged by a pinion (24) driven by a motor (25) located on the L-shaped base (20). A bearing (26) locks the pinion (24) into intimate engagement with the rack (23), such that the gantry carriage (19) is moved along the gantry (17), by the motor (25).

Figure 5:
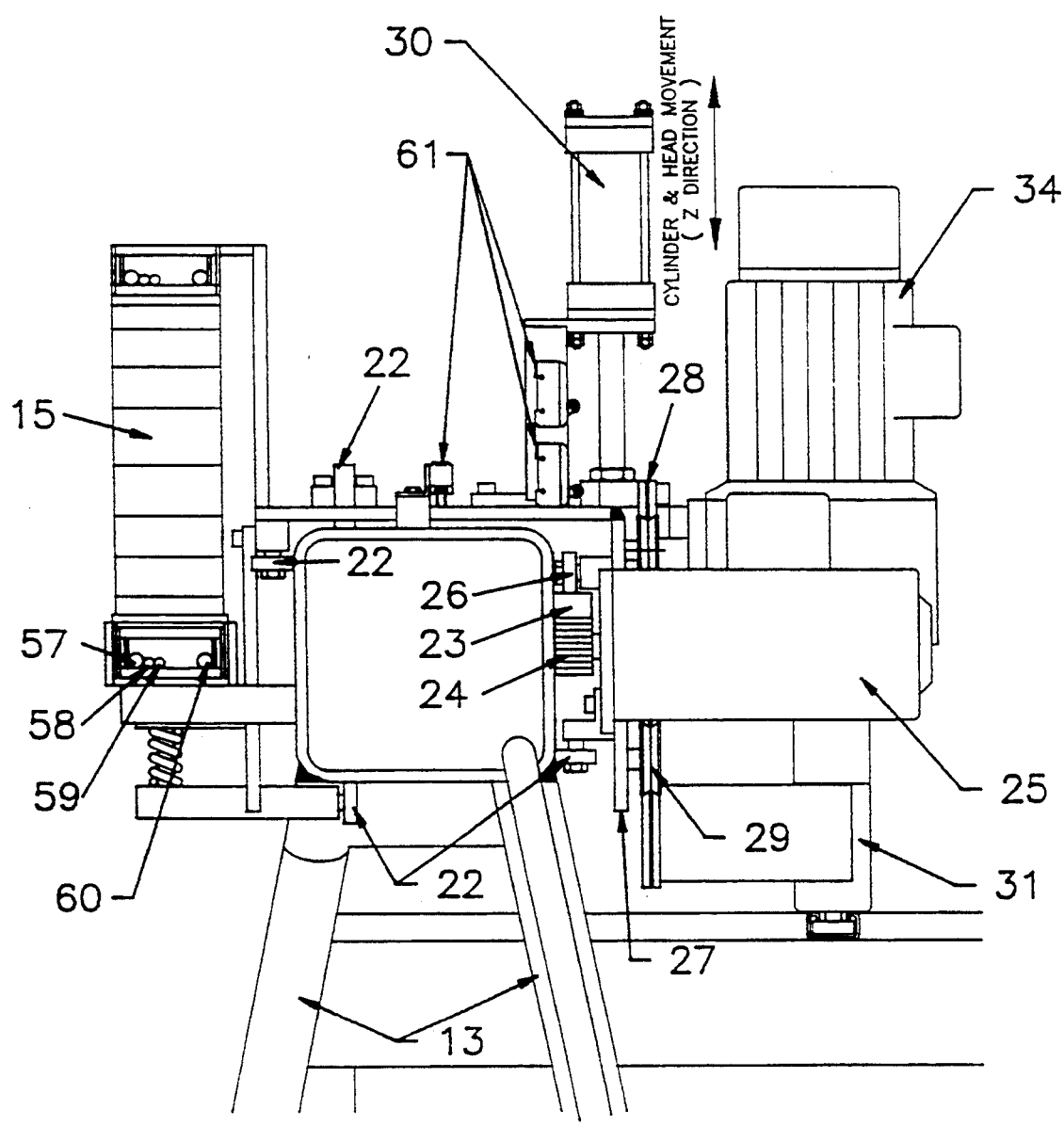
FIG. 5 illustrates an end view of the gantry with a strut cutaway for clarity sake, showing the engaging means of embodiment shown in FIGS. 1, 3 and 4 engaging a jig bobbin.
Figure 6:
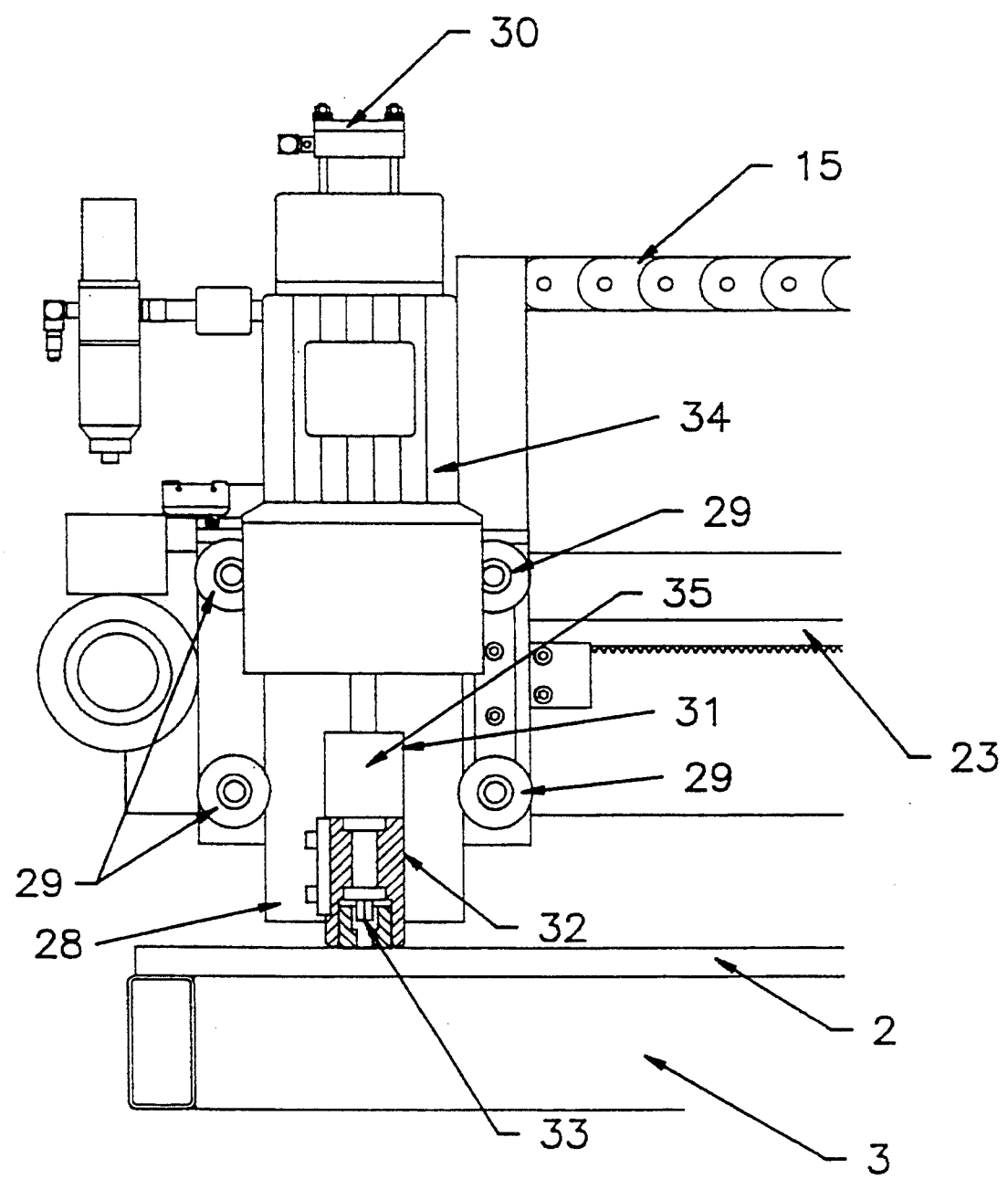
FIG. 6 illustrates a cut away view of the carriage illustrated in FIG. 5.

Located on the vertically extending arm (27) of the base (20), is a plate (28) which rides vertically between guide rollers (29) and is controlled by cylinder (30) to move the head (31) from a position where it is free of a jig bobbin (1) (FIGS. 3 and 4) to an engaging position where it engages the jig bobbin (1) (FIGS. 5 and 6).

The head (31) has a coupling means (32) which engages over the bobbing stop (10). An allen key (33) engages the head (16) of the bolt (12). The motor (34) via a single direction clutch (35) rotates the allen key (33) to loosen or tighten the bolt (12) and hence the jig bobbin (1).

The motors (36, 34, and 25) and cylinder (30) are all driven by the gantry computer. The motor cable (57), resolve cable (58), signal cable (59) and the air line (60) are carried in the cable flex (15).

Figure 7:
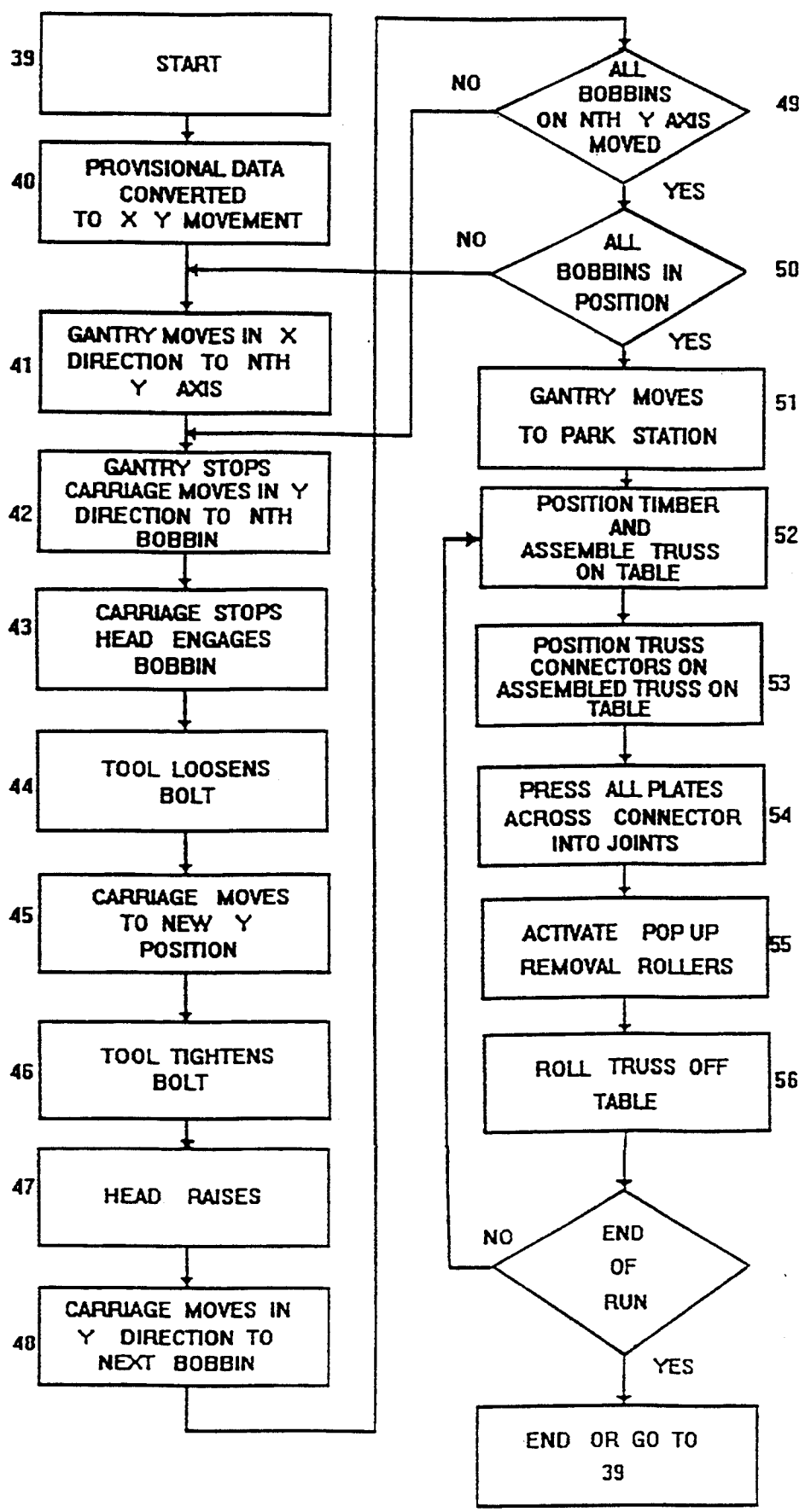
FIG. 7 illustrates a computer flow chart.

A flow diagram of the operation steps of assembling a wooden truss using one embodiment of the present invention is shown in FIG. 7.

At start (39) the diskette containing the design data is inserted into the gantry computer. The design data is converted into positional references for jig bobbins (1) located in the open channel (2) to define the external points along respective channels for the components of the wooden truss (4). The positional references are in conversion step (40) converted into an X direction along the table (3), with predetermined positions for each channel (2) and a Y direction along a respective channel (2).

On receiving this information the motor (36) located in this embodiment, in each wheeled feet (18) of the gantry (17), is operated by the gantry computer to move the gantry to align the head (31) with the first channel (2); gantry movement step (41). The gantry (17) stops its movement and the gantry carriage (19) moves across the gantry (17) in a Y direction (42), positioning the head (31) above the first jig bobbin (1); Y movement step (42).

The carriage (19) stops, in aligning step (43) and the cylinder (30) moves the engaging head (31) to cover the stop (10) of the jig bobbin (1), wherein the allen key tool (33) of head (31) fits into the slot head (16) of the bolt (12). In loosening step (44) the tool (33) is rotated by its motor (34) to loosen the bolt (12).

With the engaging head (31) locked over the stop (10) of the jig bobbin (1) the carriage (19) in carriage movement step (45), moves along the channel (2), (Y axis movement), to position the jig bobbin (1) in its new position. The jib bobbin is locked in place, in locking step (46). The head (31) is raised in the disengaging step (47), out of the bobbin stop (10), and the carriage (19) moves in Y movement step (48), to the next jig bobbin (1). In verifying step (49), the positions of the jig bobbins (1) are checked, if all jig bobbins (1) on that particular channel (2) have been positioned as required, the programme moves to verifying step (50). If not, the programme returns to step (42).

If, in verifying step (50), all of the jig bobbins (1) are not in their correct position the programme returns to step (41). If all jig bobbins (1) are in their correct position the gantry (17), in park step (51), moves back to its parking station, allowing full access to the table (3).

The truss components are then assembled (assembly step (52)) and the connector plates are then located, in step (53) and pressed across or into the joints by any suitable means, such as a roller press or hydraulic press in press step (54), and the press moves to a park station. The air operated ejection rollers (61) are then activated (roller activation step (55)) and the truss (4) slide off the table (3) in removal step (56). It will be appreciated that hydraulically operable elements may be used.

If the run is finished the programme ends. If not, the programme returns to step (39) to complete the next truss.

Figure 8:
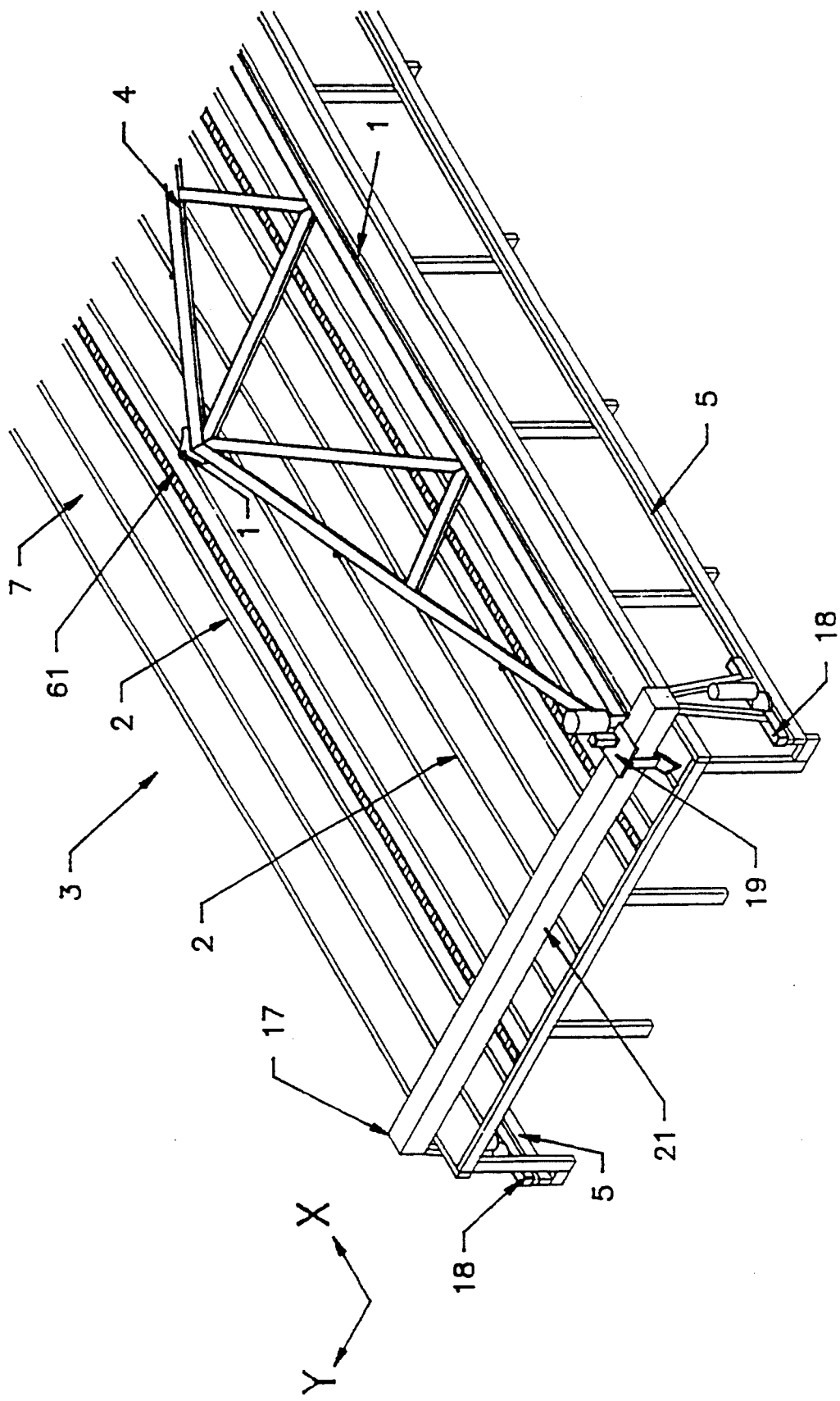
FIG. 8 illustrates another embodiment of the truss assembly apparatus.

FIG. 8 illustrates a further embodiment of the truss assembly apparatus wherein the open channels 2 and the ejection rollers 61 are positioned parallel to the tracks 5.

The particular shape or profile of the particular components shown in the embodiment can be altered without departing from the spirit or scope of the present invention.

I claim:

1. A truss assembly apparatus comprising:
   an assembly table comprising two parallel spaced apart tracks extending along two opposed sides of said table, and
   a plurality of upwardly open channels extending, parallel to each other, between said two parallel spaced apart tracks;
   jig bobbins located in said upwardly open channels and adapted to slide therealong;
   locking means, located on each jig bobbin, adapted to releasably secure the respective jig bobbin at any position along its respective upwardly open channel;
   a gantry, bridging said tracks and adapted to travel along said tracks;
   a gantry carriage adapted to travel across said gantry, between said tracks;
   engaging means, located on said gantry carriage, adapted to individually engage said jig bobbins and to operate said locking means of said jig bobbin;
   store means adapted to store positional information, designating the position of each jig bobbin for a predetermined truss design; and
   operating means adapted to act on said positional information received from said store means, to move said gantry along said track and said carriage across said gantry;
   whereby, in use, said operating means moves said engaging means to individually engage respective jig bobbins and to unlock its locking means and to move the respective jig bobbin to a required position where said locking means is activated, and said engaging means then disengages from said jig bobbin, leaving said jig bobbin in its position for a predetermined truss design.

2. A truss assembly apparatus according to claim 1 wherein said channels each having an opening being smaller in width than the width of said channel and each of said jig bobbins comprise a stop which extends out of said respective channel opening, a bolt which passes through said jig bobbin and engages in a clamp member which is able to slide along said respective channel but is restrained from rotation within said channel, whereby said locking means comprises the interaction of said bolt, stop and said clamp member on said channel.

3. A truss assembly apparatus according to claim 2 wherein said engaging means comprises a head adapted to fit over said stop, so as to move said jig bobbin along its respective channel; and a drive means to connect with said bolt to tighten or loosen said bolt.

4. A truss assembly apparatus according to claim 2 wherein there are at least two jig bobbins in at least some of said channels.

5. A truss assembly apparatus comprising:
- a table including a plurality of parallel spaced apart tracks extending along opposed sides of said table;
- a plurality of upwardly open channels extending parallel to each other and located between said tracks;
- a plurality of jig bobbins located in said upwardly open channels and adapted to slide therealong;
- locking means located on each respective said jig bobbin and adapted to releasably secure the respective jig bobbins at any position along its respective upwardly open channel;
- a gantry bridging said tracks and adapted to travel along said tracks;
- a gantry carriage movably mounted on said gantry and adapted to travel across said gantry between said tracks;
- engaging means located on said gantry carriage and adapted to individually engage a respective said jig bobbin and to be operatively associated with said locking means of said respective jig bobbin;
- store means adapted to store positional information, designating the position of each respective jig bobbin for a predetermined truss design; and
- operating means adapted to act on said positional information received from said store means and to move said gantry along said track and said carriage across said gantry;
- whereby, in use, said operating means moves said engaging means to individually engage a respective said jig bobbin, to unlock its locking means and to move a respective said jig bobbin to a required position where said locking means is activated and said engaging means then engages from a respective said jig bobbin, leaving a respective said jig bobbin in its position for a predetermined truss design.

6. A truss assembly apparatus according to claim 5 wherein said plurality of parallel spaced apart tracks comprise two tracks.

7. A truss assembly apparatus according to claim 6 wherein said upwardly open channels are located between and transversely disposed to said two parallel spaced apart tracks.

8. A truss assembly apparatus according to claim 6 wherein said upwardly open channels are located between and parallel to said two parallel spaced apart tracks.

* * * * *